MICROCOMB-TYPE MAGNETIC RECORDING HEAD

Filed March 28, 1968 3 Sheets-Sheet 1

INVENTORS
MARVIN E. ANDERSON
JAMES N. VAN SCOYOC
DONALD B. OWEN
ANTHONY P. VAN DEN HEUVEL
BY Hill, Sherman, Meroni, Gross & Simpson
ATTORNEYS

MICROCOMB-TYPE MAGNETIC RECORDING HEAD

Filed March 28, 1968 3 Sheets-Sheet 2

INVENTORS
MARVIN E. ANDERSON
JAMES N. VAN SCOYOC
DONALD B. OWEN
ANTHONY P. VAN DEN HEUVEL

BY Hill Sherman Meroni Gross & Simpson
ATTORNEYS

MICROCOMB-TYPE MAGNETIC RECORDING HEAD

Filed March 28, 1968

3 Sheets-Sheet 3

INVENTORS
MARVIN E. ANDERSON
JAMES N. VAN SCOYOC
DONALD B. OWEN
ANTHONY P. VAN DEN HEUVEL

BY Hill, Sherman, Meroni, Gross & Simpson
ATTORNEYS

3,553,716 MICROCOMB-TYPE MAGNETIC RECORDING HEAD

Marvin E. Anderson, South Holland, James N. Van Scoyoc, Oak Park, Donald B. Owen, Chicago, and Anthony P. van den Heuvel, Homewood, Ill., assignors to IIT Research Institute Chicago, Ill., a not-for-profit corporation of Illinois Filed Mar. 28, 1968, Ser. No. 716,719
Int. Cl. G11b *5/16, 5/20, 5/28*
U.S. Cl. 346—74 24 Claims

ABSTRACT OF THE DISCLOSURE

A magnetic digital recording head of comb type, capable of packing densities, for example, on the order of one million bits per square inch of recording medium, in which a core structure is constructed to extend across a cooperable magnetizable recording medium, movable relative thereto, and receives a plurality of conductors each of which is provided with a portion extending in the direction of movement of the recording medium, transversely across the core structure in spaced relation, with portions of the core structure intermediate adjacent conductors forming pole elements cooperable with such conductors for effecting magnetic recording on such a recording medium, the pole elements having flux directing areas, arranged for cooperation with such a recording medium, which have a thickness in the direction of said movement less than .5 mil, and a width transverse to such direction of movement of less than 2 mils, the spacing between adjacent pole elements being less than 2 mils.

The invention also includes a novel method of producing such a head, in which a core structure of paramagnetic material is formed with an elongated portion having an effective width corresponding to the desired effective thickness of such pole elements, the conductors being arranged with the portions thereof, to extend across the core structure, in aligned laterally spaced parallel relation, at the same pitch distance as that of the pole elements, with the conductor portions extending across the elongated portion of the core structure in cooperable relation, the crossing portions of the conductors being secured, in insulated relation relative to one another, to the elongated portion of the core structure with the respective conductor portions adjacent to the crossing portions secured in rigid relation with respect to the elongated portion of the core structure.

BACKGROUND OF THE INVENTION

Convention digital recording systems currently operate with a maximum packing density of 14,400 bits per square inch and researchers, seeking higher density recording, have achieved in the laboratory a packing density as high as 180,000 bits per square inch. Obviously as the packing density is increased the transducer structures must necessarily decrease in size, imposing severe restrictions and problems not only in the structural design of transducers of extremely small dimensions, but also in manufacturing procedures.

The present invention thus is directed to a transducer structure capable of effecting digital recordings at least as high as one million bits per square inch of recording medium and a novel method of producing the same. More specifically the invention is directed to a magnetic recording head of comb-type configuration such as generally illustrated in Camras Pat. 2,900,443, granted on Aug. 18, 1959, which involved video recording operations. The patented construction contemplated, for example, the use of relatively wide tape, for example two-inch tape, and the thickness of the pole pieces in the direction of tape travel was such with respect to the rate of travel of the tape that adjacent recorded lines extending across the tape overlapped. While this was not objectionable in the recording techniques involved, and even advantageous, it is believed apparent that such operation is wholly unsuitable for the storage of individual bits such as herein involved.

Another head construction of the comb-type is illustrated in Anderson Pat. No. 3,164,682, in which two rows of pole pieces extend across the recording medium, cooperable with a common pole piece disposed between the two rows. While a small gap is utilized, comparable in width to that here employed, the individual gaps extend longitudinally and not transversely with respect to the direction of movement of the recording medium, i.e. each gap is formed by longitudinally spaced pole pieces, not transversely space pole pieces as in the present head construction. Further in the Anderson disclosure two series of heads, extending across the recording medium are formed, with the heads, and thus the gaps of one series being laterally offset with respect to the heads and gaps of the other series, as a result of an offsetting of the pole pieces of the heads of one series with respect to the pole pieces of the heads of the other series. In this construction there are provided in a single series only approximately 250 heads and recording gaps per inch of width of the recording medium, thus requiring approximately twice the tape width and two rows of heads to provide a like number of storage cells as that of the present invention.

The present invention is therefore directed to a magnetic recording head of a construction having capabilities of packing densities on the order of one million bits per square inch under practical operating conditions. Obviously the elements of the head structure must be exceedingly small and the problem presented thus is two-fold, first the design of a structure which possesses the requisite size and operating characteristics required and thus functionally adequate, while the second pertains to the ability to produce such a head structure by reasonable and practical methods, in particular methods which will result in consistently uniform reproduction of the desired structure.

The present invention thus is directed not only to a structure for achieving the desired results but a method by means of which such structures can be reproducibly manufactured.

SUMMARY OF THE INVENTION

The present invention contemplates the utilization of a magnetic recording head, having the capabilities previously referred to which employs a core structure constructed to extend across a cooperable magnetizable recording medium, movable relative thereto, transversely to the direction of movement thereof, which is cooperable with a plurality of conductors each of which has a portion extending in the direction of movement of the recording medium transversely across the core structure in spaced relation, with the portions of the core structure operatively disposed intermediate adjacent conductors forming respective pole elements. Thus, upon current flow in a conductor, the resulting magnetic flux will be concentrated by the adjacent pole elements into a very small magnetizing region. The pole elements so formed will have respective effective flux-directing areas, arranged for cooperation with the recording medium, which have a thickness in the direction of movement of the recording medium of less than .5 mil, and a width transverse to such direction of less than 2 mils, with the spacing between adjacent pole elements likewise being less than 2 mils. For example, the respective elements in a head structure having a capable packing density of one million bits per square inch may be so constructed that such flux-directing areas of the pole elements have a thickness on the order of .25 mil, a width on the order of .5 mil and a spacing at said conductors between adjacent pole elements on the order of .5 mil. The resulting head structure with its series of spaced pole elements and cooperable conductors presents what may be generally termed a comb-like configuration.

The present invention also is directed to the production of such a head structure, in which an elongated core structure of paramagnetic material is formed with the portions to comprise the respective pole elements having an effective width corresponding to the desired effective thickness of such pole elements. A plurality of conductors are provided and arranged with portions thereof, to extend across the core structure, aligned in laterally spaced, parallel relation at the same pitch distance as that of the pole elements, with the conductor portions extending across the core structure in cooperable relation. The crossing portions of the conductors, in insulated relation to one another, are secured to the core structure with the portions of the latter, operatively disposed between such conductors, forming the pole elements. The conductor portions adjacent to such crossing portions are likewise secured in rigid relation with respect to the core structure.

The sequence in which the various steps in the manufacture of the head structure are performed will vary with the structural details of the particular head design involved. Thus, the core structure may be fabricated as an individual element, for example, a slotted strip on a generally helically shaped structure, constructed to receive individual conductors and the respective components assembled and secured into a unitary assembly. In another form of the invention the conductors, together with suitable insulating means, may be applied to an element which is to form the core structure and the individual pole elements then formed in a subsequent operation. In a further embodiment of the invention, the core structure and conductor elements, as well as any insulating means may be produced in the form of respective layers successively applied upon a substrate. The structure may also be produced according to the invention by the use of bulk materials, forming the core structure in situ.

DESCRIPTION OF THE DRAWINGS

In the drawings wherein like reference characters indicate like or corresponding parts.

DETAILED DESCRIPTION

As the present invention involves the method of making a head structure as well as the structural design thereof, the drawings of the respective embodiments of the invention are so presented that they disclose not only the structural details but also details with respect to the manufacture thereof.

Figure 1:
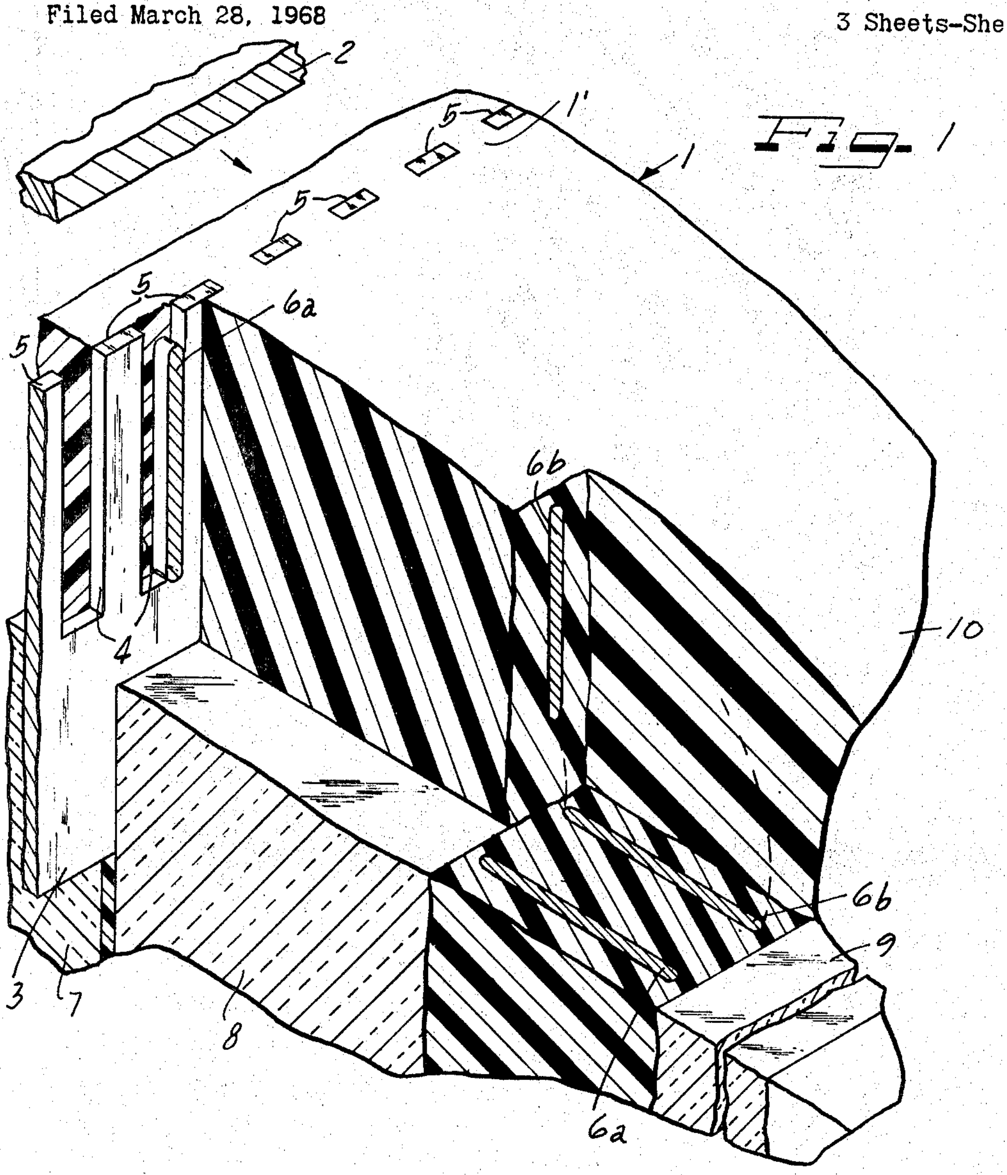
FIG. 1 is a fragmentary view, in perspective, of a portion of a magnetic head structure constructed in accordance with the invention, with portions thereof broken away to show details thereof, as well as illustrate the manner in which it may be produced.
Figures 2, 3, 4:
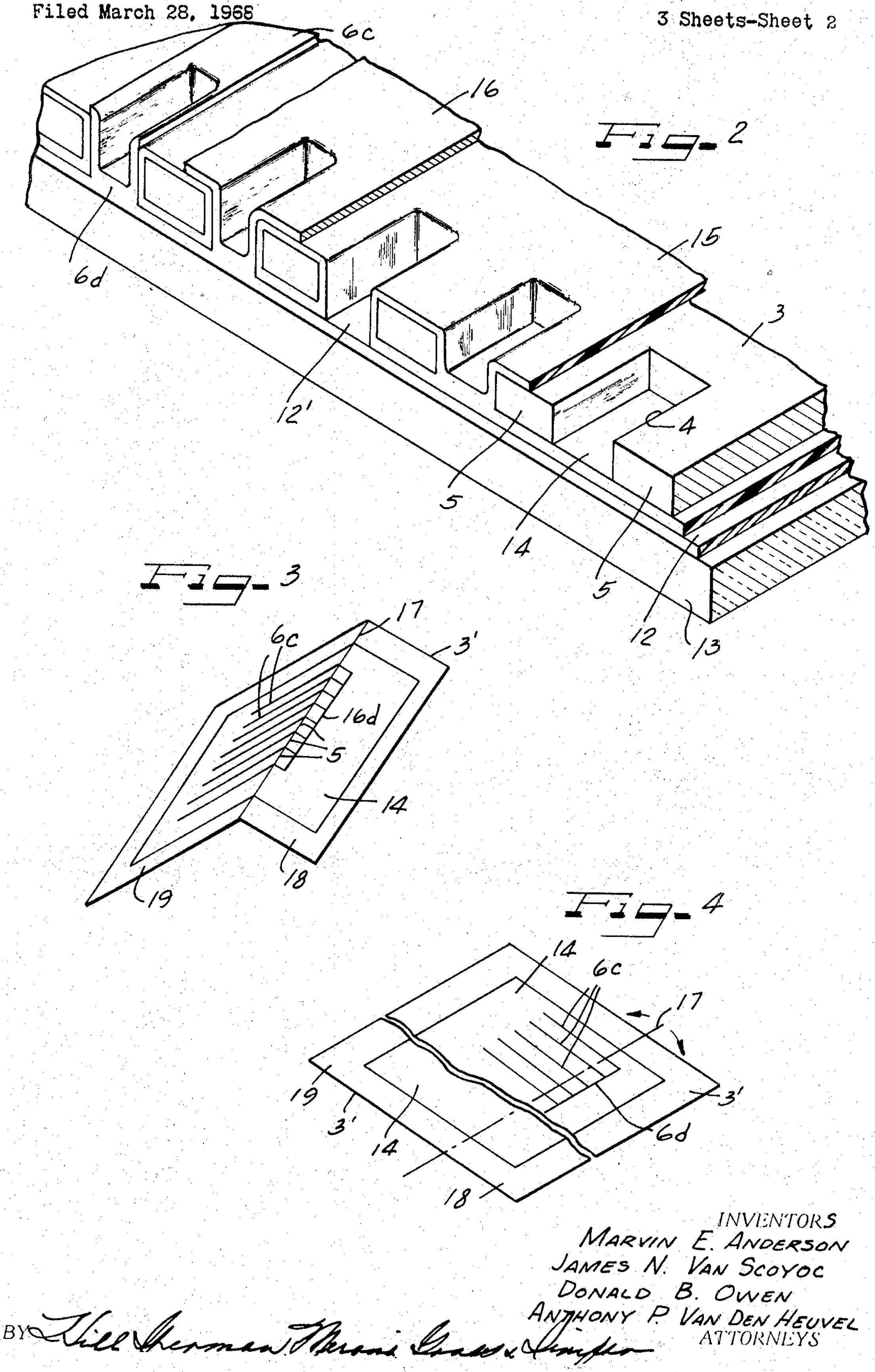
FIG. 2 is a fragmentary view, in perspective, of a portion of a head structure illustrating another structural embodiment of the invention with the various structural elements arranged to show the successive steps in the manufacture thereof.
FIG. 3 is a perspective view of a further embodiment of the invention utilizing a core structure of sheet metal.
FIG. 4 is a perspective view of the embodiment of FIG. 3, illustrating successive steps in the fabrication thereof prior to the bending of the sheet to the configuration illustrated in FIG. 3.
Figure 7:
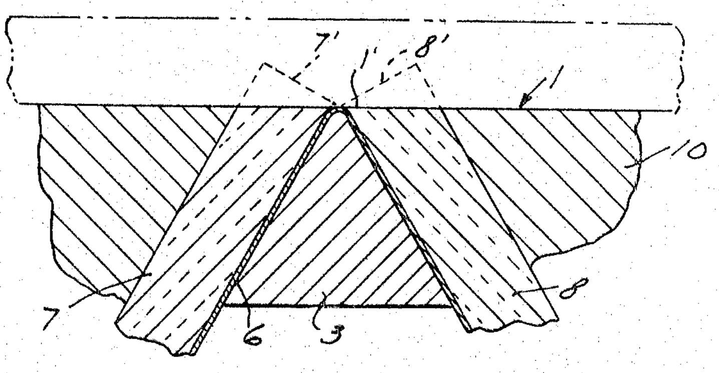
FIG. 7 is a transverse sectional view through embodiment of the invention similar to that illustrated in FIG. 5 but constructed from bulk materials.
Figure 5:
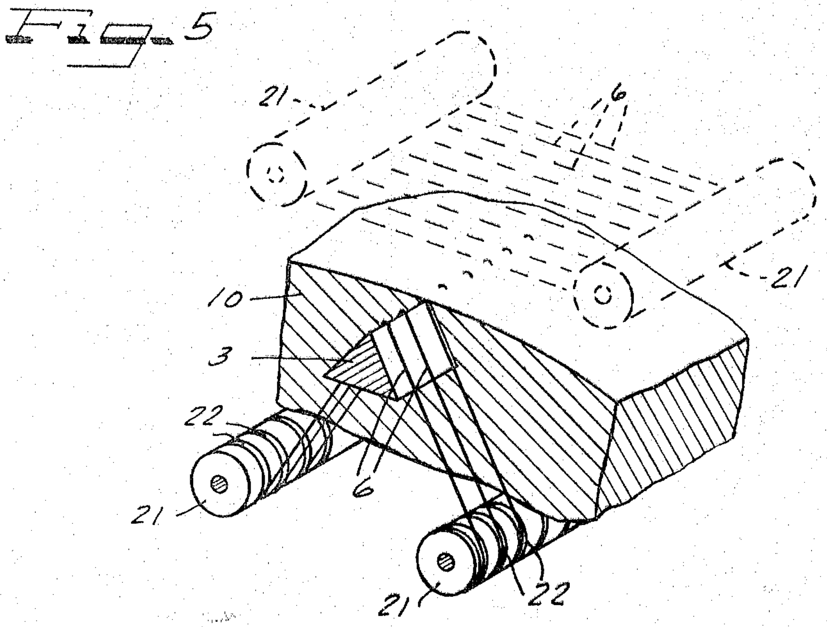
FIG. 5 is a fragmentary view in perspective of still a further embodiment of the invention, likewise illustrating steps in the production thereof.

FIGS. 1 and 5 illustrate examples of the invention in which the respective components are in the form of individual elements which are subsequently assembled into a unitary head structure while FIGS. 2, 3, and 7 illustrate examples in which components are created in the fabrication of the structures.

Referring to FIG. 1, the reference numeral 1 designates generally a portion of a magnetic recording head structure which is to be cooperable with a recording media such as magnetic tape of known construction, a portion 2 of which is illustrated, and which is adapted, for example, to be moved in the direction of the arrow with respect to the recording surface 1', formed by the upper face of the head 1.

The operative elements of the head comprise a core structure 3, illustrated as being in the form of a relatively thin metal strip of a paramagnetic material, as for example, so-called "permalloy," a nickel-iron alloy having high permeability, which is suitably formed with a plurality of slots 4 therein disposed in parallel relation and intersecting the top edge of the strip 3, as viewed in FIG. 1, forming individual pole elements 5. Cooperable with the core structure 3 are a plurality of conductors 6, portions of only two of such conductors, *6a*, *6b* being shown. As illustrated with respect to the conductor *6a*, each of the conductors has a portion of elongated cross-section thereof disposed in a respective slot 4, which portions extend transversely to the general plane of the core structure 3, in substantially the same direction as that of the movement of the tape 2 and thus across the core structure.

It will be apparent that upon passage of a current through one of the conductors, the magnetic flux set up as a result of such current flow will be concentrated by the adjacent pole elements with the flux path being completed across the gap between the ends of such pole elements, such flux path being generally semi-circular and in the presence of the tape 2 will produce corresponding magnetization thereof. In so far as possible cross talk is concerned, considering the non-linear characteristics of magnetic tape, good rejection of cross talk in adjacent tracks can be achieved. For example if high frequency bias is utilized in connection with the recording, the cross talk rejection will more or less correspond to the difference in flux path lengths of the primary record field as compared to the cross talk field, which in this type of structure will normally be approximately five to one. For the high packing densities here involved, the pole elements 5 should be so formed that the effective flux-directing areas thereof, arranged for cooperation with the recording media, have a thickness in the direction of the media movement of less than .5 mil and a width transverse to such direction of movement of less than 2 mils, with the spacing between the adjacent pole elements formed by the slots 4 likewise being less than 2 mils. A dimensioning of the pole elements which at the present time appears preferable, and having capabilities for use in recording at packing densities on the order of one million bits per square inch of recording media, is one in which the thickness of the pole elements is approximately .25 mil, the width .5 mil and the spacing between adjacent pole elements likewise .5 mil.

In connection with the production of a recording head such as illustrated in FIG. 1, it will be appreciated that the dimensions are of such values that the usual type of procedures heretofore employed in connection with considerably larger magnetic recording heads is generally inapplicable to production of heads embodying the invention. Some concept of the problem may be gathered by comparison of the above structure with that disclosed in the previously referred to Camras patent, in which the example therein illustrated employed tape two inches in width, and assuming as therein described a total of 500 recording fields across a 2-inch tape, i.e. 250 fields per inch, a pole thickness as described of 1 mil, and a pole width approximately equal to the corresponding thickness of the conductors employed, each pole element would have an effective flux-directing area of substantially 1 mil by 2 mils. Comparing these dimensions, for example, with a pole element according to the invention having a thickness of .25 mil and a width of .5 mil, the corresponding dimensions of such a pole element represent only 25% of that of the corresponding elements of the patent and only slightly over 6% of the bulk thereof.

In the construction of a head such as that illustrated in FIG. 1, a strip of paramagnetic material of dimensions suitable for the core structure 3, is suitably processed, for example, by chemical etching to produce the slots 4 in one edge thereof, such operation including any necessary cleaning, pre-etching, masking and ultimate etching, as may be deemed necessary or desirable. The masking will normally be accomplished by photographic techniques involving reduction and image transfer, utilizing suitable masking materials and known techniques.

Following fabrication of the core structure 3 it may be suitably disposed between a pair of supporting sheets 7 and 8 of suitable material, as for example glass, having sufficient thickness to provide adequate re-inforcement for the extremely thin core structure 3. The respective conductors 6 may be of suitable configuration, for example of elongated cross-section as illustrated, which can be produced in the drawing thereof or by the flattening of wire of circular cross-section. Such conductors are threaded through the slots 4 in any suitable manner, as for example, if deemed desirable, with the aid of supporting mandrels similar to those illustrated in connection with the structure of FIG. 5. The crossing portions of the conductors disposed in the slots 4, together with the immediately adjacent portions of the conductors, may then be secured to the core structure and adjacent portions of the glass plates 7 and 8 by means of suitable material, as for example an epoxy, following which the remaining portions of the respective conductors may be dressed downwardly as viewed in FIG. 1 along the adjacent face of the plate 8. The portions of the conductors 6 at the opposite side of the core structure 3 may be similarly disposed with the free conductor ends dressed along the face of the plate 7. An additional plate 9, similar to the plates 7 and 8 may be disposed in parallel relation with respect to the plate 8, as well as the plate 7, adjacent the respective conductor portions thereat with the plates 9 exending parallel to the plates 7 and 8 and the entire recording area encapsulated in a suitable material 10, such as an epoxy. The surface 1' of the recording area is then finished by suitable operations, including lapping and polishing, to provide a smooth surface as illustrated in FIG. 1. The free ends of the respective conductors may then be operatively connected to suitable terminal elements or the like by means of which operative connection may be made to the individual conductors.

The present invention readily adapts itself to thin film techniques, even to the extent of using such techniques exclusively, with the possible exception of terminal means. The depositions of conducting and insulating films may be accomplished by the utilization of state-of-the-art techniques.

FIG. 2 illustrates an embodiment of the invention which may be fabricated by such techniques and employs a core structure 3 having slots 4 therein, forming pole elements 5 and respective conductors corresponding to the conductors 6 of FIG. 1, only one complete conductor being illustrated in FIG. 2. The respective conductors of the latter are provided with respective individual portions 6*c* disposed at one side of the core structure 3 with their end portions extending into the gaps between adjacent pole elements 5 and connected to a common conductor 6*d*, disposed at the other side of the core structure 3, comprising a conductive layer 12. The entire structure may be suitably supported on a substrate 13, illustrated as consisting of a sheet of suitable material as for example glass. The physical dimensions of the core structure 3 would, in the absence of special circumstances, correspond to those previously described in connection with FIG. 1.

Assuming that the core structure 3 consists of a conductive metal such as "permalloy," this embodiment of the invention may be fabricated in the following manner:

A conductive layer 12 is initially applied to the top face of the substrate 13, as for example a layer or film of suitable metal. A layer 14 of suitable known insulating material is then applied to the conductive layer 12 followed by a heavier layer of metal forming the core structure 3. The core structure may for example be "permalloy," or a similar iron-nickel alloy and may for example be vacuum-deposited or sputtered. Upon completion of the applying operation, the layer may be suitably masked and subsequently chemically etched to form the slots 4 therein, followed by the application of a second insulating layer 15. The surface of the conductive layer 12 at the respective slots 4 is then exposed as indicated at 12'. This last result may be achieved, for example, by suitably mechanically removing the insulating layers from the face of the conductive layer 12, or by suitable masking during the production of the insulating layers 14 and 15 whereby no insulating material is deposited on the portions 12' of the conductive layer. This could be accomplished, for example, by providing a masking layer over the areas 12' prior to the formation of the insulating layer 14, with the masking layer having a thickness substantially equal to that of the layer 14, followed by deposition of the metal forming the core structure 3 upon the insulating layer 14 as well as the respective areas covered by the masking layer. Following etching out of the slots 4 and additional masking of the areas 12' insulating layer 15 is applied to the structure. The area 12' of the conductive layer may then be exposed by removal of the respective masking means associated therewith.

Following exposure of the portions 12' of the conductive layer 12 a metallic layer 16 may be suitably deposited over the face of the structure, with such metal lining the adjacent walls of the slots 4 as well as conductively uniting with the exposed areas 12' of the conductive layer 12. The metallic layer 16 may then be suitably masked to define the conductors 6*c* and undesired portions removed by chemical etching or the like. Thus individual conductor portions 6*c* are produced from the finally deposited metallic layers 16 while the conductive layer 12 forms a common conductor 6*d* to which the ends of each respective conductor portion 6*c* are secured at the corresponding areas 12'. In this respect, it will be apparent that it may be desirable in specific applications to utilize printed circuit techniques in connection with the etching of the metallic layer 16 whereby terminal portions for the respective conductors, and possibly other elements may be simultaneously produced.

While FIG. 2 illustrates the use of layers 14 and 15 of insulating material, required where the core structure 3 consists of a conductive metal, in the event the core structure is, for example, of a suitable ferrite or the like having adequate insulation characteristics, the insulating layers 14 and 15 may be omitted, thus considerably simplifying the fabrication of the structure. Upon completion of either form of this embodiment of the invention the entire structure may be encapsulated in epoxy or other suitable material to form a unitary head structure with the top face of the latter being suitably lapped and polished, as previously described with respect to the structure of FIG. 1.

FIGS. 3 and 4 illustrate a further embodiment of the invention of extremely simple construction, also utilizing thin film techniques in its manufacture.

In this construction the core structure 3' is fabricated from a single sheet of metal, for example "permalloy," which is bent along a straight line 17 to form a pair of wall portions 18 and 19 which extend at an angle to one another and intersect along the fold line 17. Disposed on the sheet 3' is a layer 14 of insulating material upon which are deposited respective conductors 6c which extend over the juncture of the walls 18 and 19 and are operatively connected by a common conductor 6d, disposed upon the insulating layer of the wall 18. The portions of the core structure 3' extending along the juncture of the walls 18 and 19, defined by the bend line 17, and operatively disposed between the respective conductors 6c, form the respective pole elements 5.

This embodiment of the invention may be readily fabricated by performing the bulk of the operations with the sheet in planar form as illustrated in FIG. 4, initially depositing the insulating layer 14 on one face of the sheet, as illustrated in the lower left hand portion of FIG. 4, following which the conductors 6c and 6d are applied to the layer 14 by suitable thin-film techniques, and upon completion of these operations the sheet is bent along the fold line 17 to the configuration illustrated in FIG. 3. As in the previous examples, the structure of FIG. 3 may be suitably encapsulated and the upper face of the unit lapped and polished etc. to provide a smooth surface which is substantially flush with the conductors 5 and the bend 17. A particular advantage of this construction is that all of the depositions, photographic etching etc. to form the insulated conductors can be performed on a flat surface, alleviating masking problems etc.

FIG. 5 illustrates another embodiment of the invention utilizing individual components which are fabricated into a final assembly and presents an extremely simple construction. Referring to this figure, the core structure 3 is in the form of a block of ferrite or other suitable material, illustrated as being of triangular shape in transverse cross-section, the respective conductors 6 extending across the apex of the core structure with the adjacent portions of the conductors disposed along the respective inclined faces of the core structure and the assembled components encapsulated in a mass 10 of a suitable material, as for example, an epoxy.

Fabrication of this embodiment of the invention may be readily accomplished in a very simple manner, first fabricating the core structure 3, the particular steps involved therein depending upon the nature of the material employed. The respective conductors 6 are suitably supported in parallel relation between two mandrels 21, which in the embodiment illustrated are provided with peripheral grooves 22 therein, spaced at the pitch distance of the conductors, and of a size to receive and maintain the same in operative alignment. The core structure 3 may be suitably supported with the conductors extending transversely thereacross, for example as illustrated in dotted lines in FIG. 5, and by suitable relative movement between the mandrels and the core structure, the conductors may be brought into the positions illustrated in which the respective conductors extend across the apex of the core structure and lie along the respective inclined walls thereof. While supported in such positions the encapsulating material 10 may then be suitably applied in one or more operations and thereafter suitably worked, including lapping and polishing to provide the desired record surface. Obviously, if the core structure 3 is of a material such as a suitable ferrite, having adequate insulating characteristics the conductors may be applied directly to the core structure. However, if the core structure is of a conductive material it may be provided with a layer or film of insulating material prior to application of the conductors thereto whereby the layer are suitably insulated from the core structure and from one another.

Figure 6:
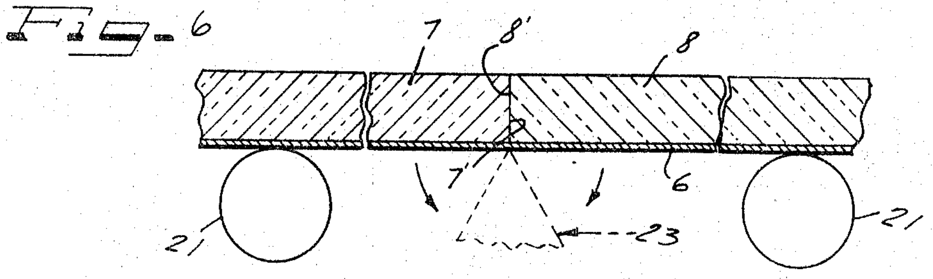
FIG. 6 is an end elevational view of some of the components of the construction illustrated in FIG. 7 at intermediate stage in the manufacture of such construction.

FIGS. 6 and 7 illustrate another method of forming a recording head which, in its finished form, closely resembles that illustrated in FIG. 5 but in which the core structure is produced from bulk material. Referring to FIG. 6, two sheets or plates, for example such as the glass plates 7 and 8 of the construction in FIG. 1, provided with planar mating end edges 7' and 8' respectively, and disposed in abutting relation. A plurality of conductors 6 are suitably supported for example by mandrels 21, with the respective conductors extending parallel to one other at the desired pitch distance, and while so supported the conductors are disposed adjacent the plates 7 and 8, as illustrated, and suitably secured to the adjacent face of the respective plates by an epoxy or other suitable material, preferably present merely in a quantity sufficient to provide adequate adhesion of the conductors to the plates. Following completion of such operation the plates 7 and 8 are pivoted into positions approximating those illustrated in FIG. 7, utilizing, if desirable, a fixture or member 23, indicated in dotted lines in FIG. 6, to suitably support the conductors 6 at their points of bending, which takes place in the direction of the arrows. Following the bending operation the glass plates 7 and 8 may be suitably supported in the relative positions illustrated in FIG. 7, but inverted with respect thereto whereby the glass plates, in effect, form the side walls of a mold for the reception of the bulk material forming the core 3, the plates 7 and 8 being supplemented by suitable members at either end thereof to insure retention of the bulk material. Such material may consist, for example, of suitably prepared ferrites in combination with a suitable binder as for example an epoxy, resulting, following setting and any curing thereof, in a core structure closely resembling the core 3 of FIG. 5. The entire assembly may then be encapsulated in a suitable material as for example an epoxy, which may completely cover the end portions of the plates as illustrated in dotted lines, following which the assembly is suitably worked to form the recording face thereof, in which the core material may extend between the apex portions of the respective conductors to produce individually formed pole elements. It will be appreciated that this embodiment also offers the advantage that the head surface adjacent the recording area consists of glass and thus will provide suitable wear characteristics.

Operational studies of magnetic recording heads constructed in accordance with the invention have disclosed that a current in one of the conductors, sufficient to produce a suitable coercive field at the tape surface to insure satisfactory recording at the gap between a pair of pole elements adjacent the energized conductor, may be readily maintained at a sufficiently low value that the field produced in the pole elements adjacent to the active poles would, without question, to be low to effect a recording therebetween. The selection of the proper record current level is strictly a function of the magnetic field required to cause adequate recording on the particular tape selected and in addition, as previously mentioned, good rejection of cross talk in adjacent tracks should be achieved.

In connection with the utilization of the present invention, read out of information which has been stored on tape, by means of a magnetic recording head, such that herein described, may be accomplished by any suitable means, as for example by utilization of the Kerr magneto-optics readout technique.

It will be appreciated from the above description that the present invention enables, a considerable increase in the storage capability of digital recording systems. For example, a head in accordance with the present invention, could employ five hundred tracks for recording on a ½-inch magnetic tape with the recording elements of the head being sequentially energized. Digital data, in either serial or parallel form, may be supplied (if in parallel form converted to serial form) and sequentially led to the elements of the recording head. For example if biased tape is used, unidirectional pulses may be recorded to indicate a digital "1" and zero record current to indicate a "0." The record current, using bias tape, thus would cause reversal of the magnetization in a single data cell.

The circuitry for effecting a sequential operation of the respective pole elements forms no part of the instant invention and any suitable circuitry may be employed, for example, such as illustrated in Pat. No. 2,698,875, issued to J. H. Greenwood. This system employs several tetrodes as gates to selectively apply voltage to recording heads extending laterally across the recording media. In operation, these tubes, which are normally cut off, are rendered operational by pulses applied to the screen grids (from an impulse generator). Thus a signal on the control grids could be applied to the conductors 6, which in such case would be connected to the plates of the tetrodes. In the present arrangement the operational pulses applied to the tetrodes would be the corresponding individual pulses (bits) to be stored.

It will be understood that variations and modifications may be effected without departing from the spirit and scope of the novel concepts of this invention.

We claim:

1. A magnetic digital recording head of the comb-type, capable of high packing densities of at least two hundred thousand to over one million bits per square inch of recording medium, comprising a core structure constructed to extend across a cooperable magnetizable recording medium, movable relative thereto, transversely to the direction of movement of the recording medium, a plurality of conductors, each having a portion extending in said direction of movement transversely across said core structure in spaced relation, said conductors dividing said core structure into a plurality of aligned pole elements cooperable with said conductors for effecting magnetic recording on such a recording medium, the pole elements so formed having effective flux-directing areas, arranged for cooperation with such a recording medium, which have a thickness in the direction of said movement of less than .5 mil, and a width transverse to such direction of movement of less than 2 mils, the spacing between adjacent pole elements being less than 2 mils, said core structure being in the form of an elongated strip of uniform thickness in which said flux-directing areas are formed from an edge of such strip, said strip being provided with slots therein which intersect said edge and are of a size to receive the crossing portions of said conductors, a relatively rigid reinforcing plate-like member disposed at each side of said strip with the latter being laminated therebetween, an additional plate-like member disposed adjacent each of said first plate-like members and secured thereto, the portions of said conductors at each side of said strip being disposed between the outer faces of said first plate-like members and the adjacent faces of the corresponding second plate-like members whereby such conductors are retained in fixed relation with respect thereto, forming a unitary assembly.

2. A magnetic digital recording head of the comb-type, capable of high packing densities of at least two hundred thousand to over one million bits per square inch of recording medium, comprising a unitary core structure constructed to extend across a cooperable magnetizable recording medium, movable relative thereto, transversely to the direction of movement of the recording medium, a plurality of conductors, each having a single conductor portion extending in said direction of movement transversely across said core structure in spaced relation, the respective single portions of said conductors dividing said core structure into a plurality of aligned pole elements, each disposed between a pair of adjacent single conductor portions and cooperable with respective conductors for effecting magnetic recording on such a recording medium the pole elements so formed having effective flux-directing areas, arranged for cooperation with such a recording medium, which have a thickness in the direction of said movement of less than .5 mil, and a width transverse to such direction of movement of less than 2 mils, the spacing between adjacent pole elements being less than 2 mils.

3. A recording head according to claim 2, wherein said core structure is in the form of a metallic sheet bent along a straight line to form wall portions which are joined along said line of bend, said conductors being in the form of conductive films extending over said line of bend and over-lying the respective adjacent wall portions, an insulating film on such wall portions, upon which insulating film the respective conductors are disposed.

4. A recording head according to claim 2 which is of laminated construction wherein said core structure, said conductors and any insulating layers therebetween comprise a plurality of thin layers united into a unitary assembly.

5. A recording head according to claim 2, wherein the pole elements of said core structure have a thickness on the order of .25 mil, and a width on the order of .5 mil, the conductors having a thickness at said pole elements of less than .5 mil and the spacing at said conductors between adjacent pole elements being on the order of .5 mil.

6. A recording head according to claim 2, wherein said core structure is in the form of elongated block of ferrite having a longitudinal edge formed by a pair of diverging walls, said conductors being in the form of individual wires extending transversely across said longitudinal edge with the adjacent conductor portions secured to said block.

7. A recording head according to claim 6, wherein said conductors are embedded in said ferrite block whereby the material thereof forms a comb-like series of individual pole elements, each extending between a respective pair of adjacent conductors, with the portions of the latter at said longitudinal edge being disposed inwardly with respect thereto.

8. A recording head according to claim 2, wherein said core structure is in the form of a thin layer, comprising in further combination a plate-like substrate, a conducting film disposed on one face of said substrate and forming a conductive part of the respective conductors, said thin core layer overlying said conductive film, and conductor strips, completing the respective conductors, extending around edge portions of said thin layer with corresponding ends of said strips conductively connected with said conductive film and the opposite ends overlying the outer face of said thin layer.

9. A recording head according to claim 8, wherein said thin layer is of conductive metal, and respective insulating films one of which is disposed between said conductive film and said thin layer, and the other of which is disposed at the outer face of said thin layer, interposed between the latter and the adjacent portions of said conductors.

10. A recording head according to claim 8, wherein said thin layer is of ferrite, and directly contacts said conductive film and said adjacent portions of said conductors.

11. A recording head according to claim 8, wherein said thin layer is provided with slots therein, the bottom edges of which define the edge portions around which the conductor strips extend.

12. A method of producing a magnetic recording head of the comb type, capable of high packing densities of at least two hundred thousand to one million bits per square inch of recording medium, employing a core structure with portions which are to be cooperable with the recording medium to be employed, and a plurality of conductors in which a single portion of each extends transversely across the core structure, for excitation thereof, in spaced insulated relation with respect to one another, with the portions of said core structure operatively lying between said single conductor portions forming pole elements, each of which has a transverse thickness of less than .5 mil and a width in the direction of elongation of said core structure of less than 2 mils, and a spacing between adjacent pole elements of less than 2 mils, comprising the steps of forming an elongated core structure of paramagnetic material with the portions to comprise the respective pole elements, having an effective width corresponding to the desired effective thickness of such pole elements, providing a plurality of individual conductors and arranging the same with the single portions thereof, to extend across the core structure, in aligned laterally spaced parallel relation at the same pitch distance as that of the pole elements, with said single conductor portions extending across said elongated core structure in cooperable relation, securing said single conductor portions to said core structure at said portions of the latter forming the pole elements with said single conductor portions in insulated relation with respect to said pole elements and to each other, and securing the conductors adjacent to said single conductor portions in rigid relation with respect to said elongated core structure.

13. A method according to claim 12, comprising in further combination, forming recesses in said elongated portion, and disposing the respective crossing portions of the single conductor portions in such recesses.

14. A method according to claim 12, comprising providing said core structure in the form of an elongated tape-like strip, forming slots in an edge thereof to form said pole elements therebetween, laminating said strip between two plate-like reinforcing members of insulating material, providing the conductors in the form of individual wires, disposing the crossing portions of said wires in said slots and following securement of such portions of the wires to said strip dressing the adjacent portions of the conductors along the outer faces of such plates, with the securement of such portions being made thereto, and then securing additional plates to the first plates to dispose said adjacent conductor portions therebetween, forming an integral head assembly.

15. A method according to claim 12, wherein said conductors are applied to the core structure by the additional step of applying the same thereto in the form of a conductive film, by a deposition operation.

16. A method according to claim 15, comprising providing said core structure in the form of a substantially flat thin sheet of conductive metal, applying an insulating film to a face of said sheet, to which film the conductors are thereafter applied, and subsequently bending said sheet along a line transversely to said conductors in a direction away from the face carrying such conductors to form the pole elements of the core structure along said line of bend.

17. A method according to claim 12, comprising the additional steps of providing a substrate, applying a layer of paramagnetic material to a face of said substrate, by a deposition operation, to form said core structure, and applying said conductors to the core structure, in the form of a conductive film, by a deposition operation.

18. A method according to claim 17, comprising in further combination, the step of slotting an edge of said core layer and disposing the crossing portions of said conductors therein.

19. A method according to claim 18, wherein the material of said core layer is conductive, comprising the additional steps of applying on the surface of said substrate, prior to the application of said core material, a conductive film, applying an insulating film upon said conductive film, then effecting the application of the core material upon such insulating film, and then applying an insulating film upon the surface of said core material, upon which insulating film the conductors are applied.

20. A method according to claim 19, wherein said conductors are formed by the deposition of a continuous conductive layer upon said second insulating layer with such conductive layer contacting said first conductive layer, and thereafter removing selected portions of the continuous conductive layer, whereby the remaining portions thereof form said conductors.

21. A method according to claim 12, comprising providing said core structure in the form of a block having a pair of intersecting faces, the juncture of which defines the pole elements, providing the conductors in the form of indvidual wires, positioning the wires, following disposition in aligned arrangement, with said crossing portons disposed in alignment with said juncture, then effecting relative movement between such wires and block to engage said crossing portions with said juncture and bend the adjacent portions down upon the adjacent block faces, and effecting securement thereto.

22. A method according to claim 21, wherein said paramagnetic material is conductive, comprising applying an insulating coating to said wires prior to the formation of said core structure.

23. The method according to claim 12, wherein said conductors are provided in the form of individual wires, and, following disposition thereof in aligned relation applying a quantity of bulk paramagnetic material, capable of subsequently retaining its formed shape, to the crossing portions of said conductors to form said core structure, in situ, therefrom.

24. A method according to claim 23, wherein said conductors, disposed in aligned relation, are secured to a pair of aligned plate members which abut along a line extending transverse to said aligned conductors, securing such conductors to the respective plates, rotating said plates out of alignment to bend said wires at said line with said plates extending angularly with respect to one another and said conductors disposed at the inner faces of said plates, applying said bulk material to said conductors, using said plates as retaining walls therefor, with such material extending between adjacent conductor bends at said line to form individually formed pole elements therebetween, encapsulating the resulting structure in a nonconductive material, and forming the recording surface at said pole elements.

References Cited

UNITED STATES PATENTS

| | | | |
|---|---|---|---|
| 3,012,232 | 12/1961 | Eckert et al. | 346—74 |
| 3,079,470 | 2/1963 | Camras | 179—100.2 |
| 3,432,839 | 3/1969 | Stapper | 346—74X |

BERNARD KONICK, Primary Examiner

G. M. HOFFMAN, Assistant Examiner

U.S. Cl. X.R.

340—174.1; 179—100.2